United States Patent [19]
Loupere

[11] 3,716,955
[45] Feb. 20, 1973

[54] LIGHT-WEIGHT CELLULAR STRUCTURE

[75] Inventor: André Loupere, Arcachon, France

[73] Assignee: Commissariat A L'Energie Atomique, Paris, France

[22] Filed: Nov. 1, 1971

[21] Appl. No.: 194,318

[52] U.S. Cl. ..................52/227, 52/397, 52/618, 248/358 R
[51] Int. Cl. ..............................F16f 15/04
[58] Field of Search........52/503, 618, 397, 403, 227; 248/21, 22, 358 R, 350

[56] References Cited

UNITED STATES PATENTS 3,101,744 8/1963 Warwaka..........................248/358 R
3,342,447 9/1967 Marsh ....................................248/21

*Primary Examiner*—John E. Murtagh
*Attorney*—William B. Kerkam et al.

[57] ABSTRACT

A cellular structure each cell of which is constituted by a stiff outer box and a stiff inner box, with a damping means therebetween.

The two boxes of each cell cooperate without being in direct contact, by means of mating male and female ribs mounted in a herring-bone pattern, said ribs being located in the cell and inwardly directed.

Preferably, the structure surfaces are coated, at least at the junctions between adjacent cells, with a thermal insulator.

15 Claims, 4 Drawing Figures

LIGHT-WEIGHT CELLULAR STRUCTURE

The present invention relates to a cellular structure adapted to resist various mechanical stresses (tension, compression, shearing, bending and torsional stresses) and comprising appropriate partitioning members (flanges, webs, shells and longitudinal stiffning means) to resist such stresses.

French Pat. no. 69 17 928 filed on May 30, 1969, in the applicant's name, discloses such a structure each of the cells of which is constituted by an inner box and an outer box, between which a damping means is inserted; the inner box is fixed, by one of its surfaces, to one of the partitioning members, by welding, bolting, rivetting or glueing.

In the above Patent are mentioned the various materials which can be used for making such a structure, as regards both the boxes and the damping means.

The present invention aims at modifying the above cellular structure with boxes, with a view to still increase its stiffness, its resistance to alternate stresses (vibrations and oscillations) and also the damping coefficient.

More precisely, the invention relates to a cellular structure each cell of which is constituted by an inner box and an outer box between which is inserted a damping means, said cellular structure being characterized in that said inner box is free on all the surfaces thereof and the two boxes cooperate by means of coupled male and female ribs in herring bone pattern located within the cell According to the present invention, the damping means inserted between the two boxes also fills the clearances between such male and female ribs. As in the above mentioned Patent, the damping means is constituted either by a poured or injected visco-elastic material (epoxy resin, polyurethane), or by balls or granules of a ductile or plastic material, or by spring blades or else by a combination of these means.

These and others objects of this invention will be understood from the following description of a few embodiments of the invention as shown in the accompanying drawing wherein, FIG. 1 is a longitudinal cross-section, along plane I—I of FIG. 2, of a portion of a structure according to the invention, to be used as a partition, a floor, a beam or a vibrating frame;

Figure 1:
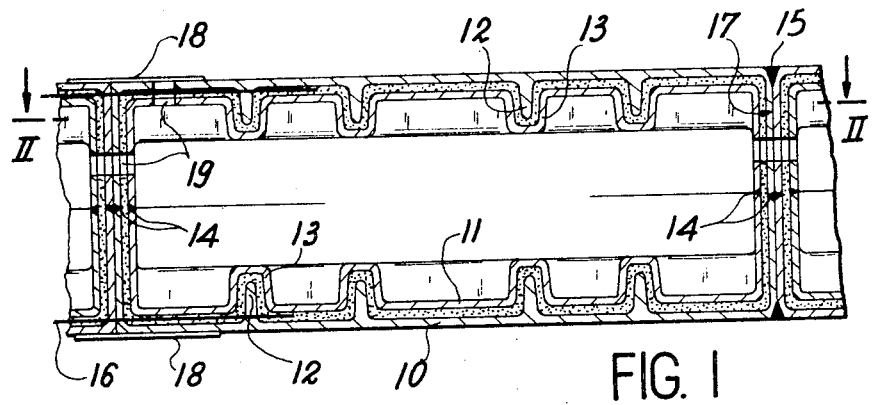
Figure 2:
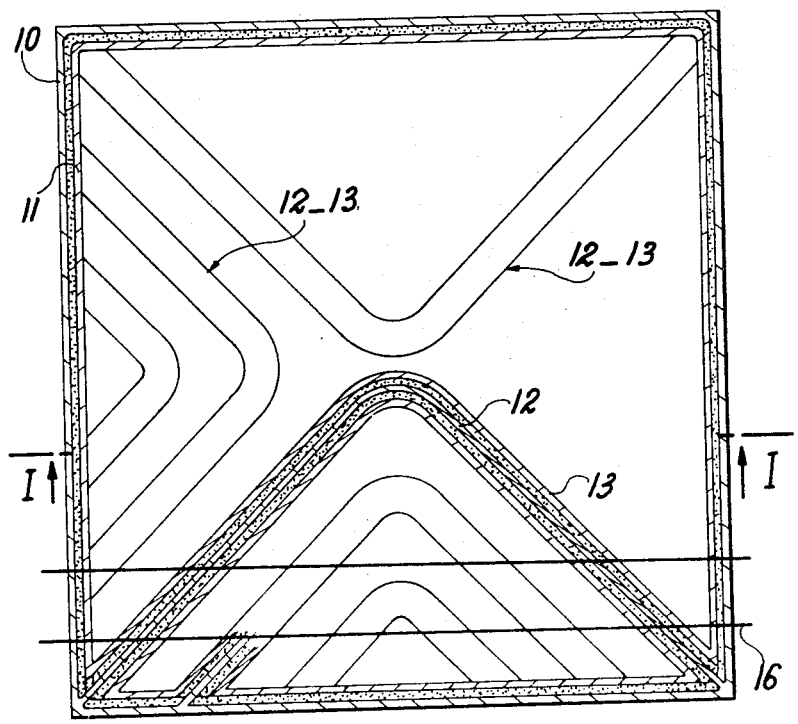
FIG. 2 is an upper cross-section of a cell of FIG. 1, along plane II—II of FIG. 1.

As shown in FIGS. 1 and 2, each cell of the structure according to the invention, comprises an outer box 10 and an inner box 11; an outer box 10, in the present instance, has been given, outwardly, a rectangular longitudinal section and a square horizontal cross-section; box 10 is wrapped about inner box 11 with a regular spacing; no fixation point is provided on the various partitioning elements. Both boxes are internally provided with ribs in herring bone pattern, viz male ribs 12 on the outer box and female ribs 13 on the inner box; FIG. 2 shows the herring bone shape of these ribs, and FIG. 1 shows how these ribs mate. It can be seen that the dimensions are such that each male rib freely moves within the corresponding female rib, so that the suitable chosen damping means, both fills the space between the boxes and the clearances provided between the ribs, which increases the quantity of damping material available.

Each box is made of two longitudinal halves, and the said two halves are assembled by welding (14).

In view of the fairly intricate design of the boxes under a wall the thickness of which can be as low as 0.8 mm, the mass production of these boxes is carried out either by pressure molding or by molding with a mobile core.

In order to obtain a very light structure, an aluminum alloy will preferably be used as ductile material for these boxes; however, a hardenable plastic material, reinforced with fibers could also be used.

The assembling of the various complete cells can be achieved by welding, as shown at 15 in FIG. 1 ; but it can be also be achieved, again as shown in FIG. 1, by means of prestressed steel wires 16, embedded in the plastic damping material, the side surfaces being glued as shown at 17. Steel wires have the function to absorb the tensile stresses which occur during bending.

Such structures can be used as partitions floors or light panels ; their boxes being made of an aluminum alloy, these structures can have a low specific weight, e. g., of from 0.2 to 0.8 kg/dm$^3$ of closed space. The herring bone pattern constitutes to the local resistance to bending and to the perforating stresses. The thermal insulation can be improved by means of an extra coating 18 (FIG. 1), e. g., of glass cloth, on the surfaces of the structure.

In the case where such structure are used as beams with a square or rectangular cross-section, or as vibrating frame, their specific weight will have to be of from 0.6 to 1 kg/dm$^3$. The herring bone pattern contributes to the overall stiffness, provides a local resistance to bending and also increases the damping effect.

Figure 3:
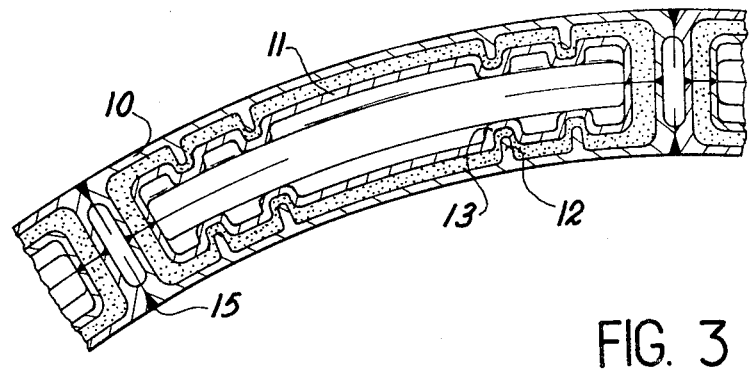
FIG. 3 is a cross-section of a portion of a structure according to the invention to be used as a cylindrical or spherical shell; and, FIG. 4 is a longitudinal section of a portion of a structure according to the invention, intended for dampening bending oscillations.

FIG. 3 shows a structure using the same type of cells ; however, since this new embodiment is adapted to the manufacture of cylindrical or spherical shells, the boxes shall have an arcuate shape, and the structure will advantageously be reinforced with steel wires or cables ; in this embodiment, the specific weight reaches a value of from 0.9 to 1 kg/dm$^3$ of closed space.

In FIGS. 1 to 3, the various cells are welded to one another by their surfaces having the said dimensions. This is by no means compulsory : for instance, two parallel flanges according to the assembly shown in FIG. 1 could be connected by intermediate webs, regularly spaced and mounted in cross fashion, at right angles to the flanges, these webs being obtained by the same process as the flanges. Such a mounting is applicable to beams with a high inertia and a long span ; the specific weight is of from 0.2 to 0.3 kg/dm$^3$ of closed space and, hereagain, the boxes are made of aluminum alloy.

Figure 4:
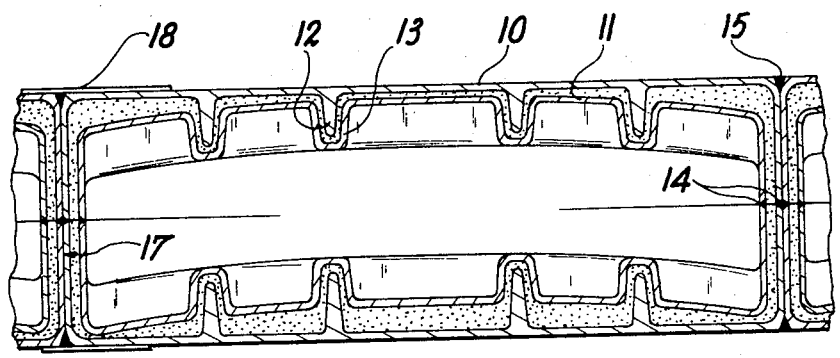

When a structure according to the present invention has to be submitted to bending oscillations, a cell of the type shown in FIG. 4 is preferably chosen, such a cell differing from the previous embodiments only, as regards the following points.

The inner box 11 is given an arcuate shape and, when being mounted on the straight outer box, it is shifted longitudinally and always in the same direction for aligned cells ; the amount of shift is such that the spacings between the two boxes, on the one hand, and the clearances between cooperating male and female ribs, on the other hand, are permanently maintained, although they may vary.

This arrangement therefore generates a non-linear bending stiffness, which prevents the corresponding oscillations from being maintained. In the case of that embodiment, the specific weight of a closed volume is of from 0.4 to 0.6 kg/dm³.

The above examples show that the present invention provides cellular structures having very low specific weights, in the range of 0.2 to 1 kg/dm³, such structures being endowed with a very high stiffness and a fair resistance to alternate stresses. Their damping coefficients are very high and intermediate between the damping coefficients of a magnesium alloy and of rubber.

Up-to-date smelting techniques permit to connect the cells by 'end-to-end' welds, by gradually increasing the thicknesses (FIG. 3). The grade of these automatically made welds can be checked according to an ultrasonic method.

Such structures can have very good thermal and sonic insulating properties.

Thermal insulation requires that the plastic damping material be appropriately selected and care must be taken to reduce thermal bridges to a minimum ; in addition, as stated above, the partitions or floors can be provided with an extra thermally insulating coating.

The inner cavities of the various cells must be caused to communicate, for instance by providing the walls of the boxes with ports, as shown, at 19 in FIG. 1.

The present invention is suitable to all types of structures undergoing severe environmental conditions of a mechanical and/or acoustic and/or thermal nature, in particular such structures as :
— vibrating frames ;
— very light structures and panels used in the field of space technology ;
— long span and heavily loaded beams and panels with webs or crosses ;
— frames of various types carrying a machine-tools, engines etc.

What is claimed is :

1. A cellular structure each cell of which is constituted by a stiff inner box wrapped by a stiff outer box with a damping means therebetween, wherein said inner box and said outer box cooperate, without being in contact, by means of mating male and female ribs in herring-bone pattern located in the cell formed by said boxes and inwardly directed.

2. A cellular structure according to claim 1, wherein said damping means in each cell completely fills the space between said inner and outer boxes and a clearance left between said male and said female ribs.

3. A cellular structure according to claim 1, wherein each box is constituted by two half-boxes connected by welding.

4. A cellular structure according to claim 3, wherein each of said half-boxes is manufactured by molding under pressure.

5. A cellular structure according to claim 3, wherein each of said half-boxes is manufactured by molding with a mobile core.

6. A cellular structure according to claim 1, wherein any two adjacent cells are assembled in a line by welding, the thickness of the walls being greater at the welding points.

7. A cellular structure according to claim 1, wherein any two adjacent cells are assembled in a line by glueing with resin and by means of pre-stressed-steel wires embedded in said damping means.

8. A cellular structure according to claim 1, wherein the inner box and the outer box of each cell are straight and are regularly spaced.

9. A cellular structure according to claim 1, wherein the inner box and the outer box of each cell are arcuately shaped and are regularly spaced.

10. A cellular structure according to claim 1, wherein the inner box of each cell is arcuately shaped and the outer box is straight.

11. A cellular structure according to claim 1, said structure being constituted by two cellular flanges connected to each other by means of intermediate cellular webs, said webs being regularly spaced and mounted in cross fashion at right angles to said flanges.

12. A cellular structure according to claim 1, wherein the specific weight of the cell closed space is of from 0.2 to 1 kg/dm³.

13. A cellular structure according to claim 12, wherein both boxes of each cell are made of an aluminum alloy.

14. A cellular structure according to claim 1, wherein the surfaces thereof are coated, at least at the junctions between the cells, with a thermal insulator.

15. A cellular structure according to claim 1, wherein the inner cavities of adjacent cells are caused to communicate, for sonic insulation purposes.

* * * * *